US010123483B2

(12) United States Patent
Verhoeven

(10) Patent No.: US 10,123,483 B2
(45) Date of Patent: Nov. 13, 2018

(54) THRESHING DRUM

(71) Applicant: CNH Industrial America LLC, New Holland, PA (US)

(72) Inventor: Marcel Verhoeven, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 301 days.

(21) Appl. No.: 15/060,096

(22) Filed: Mar. 3, 2016

(65) Prior Publication Data

US 2016/0255775 A1  Sep. 8, 2016

(30) Foreign Application Priority Data

Mar. 4, 2015  (BE) .................................. 2015/5115

(51) Int. Cl.
| | | |
|---|---|---|
| *A01F 7/02* | (2006.01) | |
| *A01F 12/20* | (2006.01) | |
| *A01F 12/18* | (2006.01) | |
| *A01F 12/24* | (2006.01) | |

(52) U.S. Cl.
CPC ................ *A01F 7/02* (2013.01); *A01F 12/18* (2013.01); *A01F 12/20* (2013.01); *A01F 12/24* (2013.01)

(58) Field of Classification Search
CPC ... A01F 7/02–7/06; A01F 12/22; A01F 12/20; A01F 12/24; A01F 12/18
See application file for complete search history.

(56) References Cited

U.S. PATENT DOCUMENTS

| | | | |
|---|---|---|---|
| 2,327,901 A | 8/1943 | Johnson et al. | |
| 2,361,633 A | 10/1944 | Douglas | |
| 2,829,652 A | 4/1958 | Dietrcih | |
| 3,079,924 A | 3/1963 | Dietrich | |
| 3,122,144 A | 2/1964 | Klemm et al. | |
| 3,256,887 A * | 6/1966 | Ausherman | A01F 12/20 460/71 |
| 3,481,344 A * | 12/1969 | Stokland | A01F 12/20 460/71 |
| 3,927,679 A * | 12/1975 | Ausherman | A01F 12/22 460/71 |
| 5,254,036 A * | 10/1993 | Johnson | A01F 12/22 460/110 |

(Continued)

FOREIGN PATENT DOCUMENTS

| | | | |
|---|---|---|---|
| CA | 2380995 A1 * | 12/2002 | ............. A01F 7/067 |
| DE | 899290 C | 12/1953 | |
| DE | 102005014329 A1 | 10/2006 | |

OTHER PUBLICATIONS

DIN 5305-08, Harteprufung nach Shore A and Shore D, Aug. 2000, DIN Deutsches Institut fur Normung e. V. Berlin.

(Continued)

*Primary Examiner* — John Weiss
(74) *Attorney, Agent, or Firm* — Patrick M. Sheldrake

(57) ABSTRACT

An agricultural combine has a threshing drum and a matching concave, the threshing drum comprising multiple threshing slats having an outer surface segment which, when the drum is rotated with respect to the concave with crop material in the drum, beats and squeezes the crop material thereby releasing grain from residue in the crop material, wherein at least the outer surface segment is formed from a material having a Shore A hardness higher than 90 and lower than 95.

15 Claims, 3 Drawing Sheets

(56) References Cited

U.S. PATENT DOCUMENTS

| | | |
|---|---|---|
| 5,624,314 A | 4/1997 | Welch |
| 5,885,155 A | 3/1999 | Dwyer et al. |
| 2012/0214560 A1* | 8/2012 | Murray .................. A01F 12/22 460/71 |
| 2015/0087363 A1* | 3/2015 | Holtmann ............... A01F 7/067 460/75 |
| 2015/0189834 A1* | 7/2015 | Haase ..................... A01F 12/20 460/70 |

OTHER PUBLICATIONS

ISO 7619, "Rubber, vulcanized or thermoplastic—Determination of indentation hardness—Part 1: Durometer method (Shore hardness)", Oct. 1, 2010, ISO, pp. 17-25.

* cited by examiner

THRESHING DRUM

This application claims priority to Belgium Application BE2015/5115 filed Mar. 4, 2015, which is incorporated herein by reference in its entirety.

FIELD OF THE INVENTION

The present invention relates to an agricultural combine with a threshing drum and a matching concave.

BACKGROUND OF THE INVENTION

An agricultural combine is a self-propelled agricultural vehicle that is designed to perform two main functions. A first function is cutting the crop material from the field and drawing the crop material into the machine, and the second function is to separate grain or other seeds from the residue. After separation, the vehicle typically expels the residue onto the field via a back end of the vehicle while the grain or seeds are stored and periodically unloaded from the vehicle.

The threshing of the crop material is typically conducted by introducing the crop material into a threshing drum. This threshing drum is provided with threshing slats that rotate directly above a concave. Thereby, the distance between the threshing slats and concave is adaptable, for example by movably mounting the concave in the agricultural vehicle. Due to the rotation of the slats, and the distance between the slats and the concave, crop material is beaten and squeezed so that grain or seeds are released from the residue. In this context, it will be understood that crop material comprises a combination of grain or seeds and residue. This technique of threshing is well known and widely adopted in agricultural combines, and is therefore not described in more detail in the present description.

Particularly when grain is harvested, the beating and the squeezing of conventional threshing drums and concaves tend to crack and split a significant percentage of the grain. Cracking and splitting of the grain damages the outer shell of the grain. As a result of this damaged shell, grain is significantly more susceptible to fungus. Recent studies have shown that fungus on grain may develop toxic substances in the grain. Due to these toxic substances in the grain, the value of the grain substantially decreases when a higher percentage of the grain is cracked and split.

SUMMARY OF THE INVENTION

It is an object of the present invention to provide an agricultural combine with a threshing drum and a matching concave that is capable of threshing grain in such a manner that significantly less cracking and splitting of the grain occurs.

To this end, the present invention provides an agricultural combine comprising a threshing drum and a matching concave, the threshing drum comprising multiple threshing slats having an outer surface segment which, when the drum is rotated with respect to the concave with crop material in the drum, beats and squeezes the crop material, thereby releasing grain from residue in the crop material, wherein at least the outer surface segment is formed from a material having a Shore A hardness higher than 90 and lower than 95.

Traditionally, threshing slats are made from metal, having a hardness that is significantly higher than the hardness proposed in the present invention. Thereby, various efforts and attempts have been made to reduce the cracking and splitting of grain by, amongst others, adapting the rotating speed of the drum, redesigning the threshing slats, adapting the gap between the threshing slats and the concave and amending the form and shape of the concave. Historically, attempts have been made to provide the threshing slats with a rubber cover, for example described in U.S. Pat. No. 2,361,633 of 1944, however, these attempts were unsuccessful due to unsatisfactory wear resistance of such covers. The present invention is based on the insight that when the outer surface segment of the threshing slat is formed from a material with a Shore A hardness lower than 95, the impact on the grain when the threshing slat hits the grain at a predetermined speed is significantly decreased with respect to an impact of a metal threshing slat arriving at the grain at the same speed. Furthermore, surprisingly, tests have shown that when the outer surface segment is formed from a material having a Shore A hardness higher than 90, the wear resistance is sufficient for the agricultural combine to operate during a complete harvesting season without the necessity of replacing the threshing slats. Harvesting grain with an agricultural combine of the invention results in a significant decrease of cracking and splitting of the grain compared to a conventional combine.

Preferably, the material has a Shore A hardness higher than 91 and lower than 93, preferably about 92. Further tests have shown that the wear resistance significantly increases with a hardness higher than 91, and preferably about 92. Furthermore, the impact on the crop material is significantly decreased when a material has a Shore A hardness lower than 93, preferably about 92.

Preferably, the material is a thermosetting polymer, preferably polyurethane. Tests with various materials have shown that a thermosetting polymer, and particularly polyurethane performs good as outer surface of at least the segment of the threshing slats.

Preferably, the threshing slats comprise the metal core, wherein the material is formed at least partially around the metal core. The metal core gives the threshing slat a high strength so that the threshing slat is less likely to be damaged when for example a rock accidently enters the threshing drum. Furthermore, via the metal core, the threshing slats can be easily mounted to form the threshing drum.

Preferably, the material covers, considering the threshing slat in cross section, the complete threshing slat. By covering the complete threshing slat, releasing of the material from the metal core is prevented. Therefore, even if some surface segments of the metal core are less likely to hit the crop material, still it will be an advantage to cover these segments with the material. Because the material covers the complete threshing slat when the threshing slat is considered in cross section, wear on the material, and damaging of the material is reduced.

Preferably, the threshing drum comprises multiple spaced apart discs mounted on a threshing drum axis and wherein the threshing slats are mounted at a peripheral end of the discs substantially parallel to the axis. Such a threshing drum has proven to perform well in separating grain from residue in crop material.

Preferably, the material is omitted from the threshing slats at the location of connection between the discs and the threshing slats. By omitting, at the location of connection, the material, the metal core of the threshing slat can directly be mounted onto the discs so that a firm and tight connection can be obtained at a predefined torque of the fixation bolts. This firm and tight connection is preferential since significant external forces will be transmitted to the threshing slats during threshing.

Preferably, the threshing drum axis is arranged substantially transverse to a forward driving direction of the agricultural combine. Such set-up is typically used in the conventional agricultural combines and allows the agricultural combine to be more compact.

Preferably, the threshing slats have a curved cross-sectional shape. Due to the curved cross-sectional shape, the resistance against bending is significantly higher. This is an advantage for example when a rock accidently enters the threshing drum.

Preferably, the threshing slats have a cross-sectional shape wherein two substantially straight legs are interconnected via an intermediate curve, with an angle between the legs larger than 25 degrees, and smaller than 75 degrees. Tests have shown that beating and squeezing crop material with threshing slats formed in this manner reduces the energy needed for threshing, increases the efficiency of the threshing and reduces cracking and splitting of the grain.

Preferably, the outer surface segment comprises grooves along substantially the complete length of the threshing slat. Thereby, the grooves are preferably oriented with respect to the longitudinal direction of the threshing slat at an angle larger than 25 degrees and smaller than 75 degrees. These grooves have as an effect that the crop material is rotated during the squeezing between the threshing slats and the concave. As a result of this rotation, when processing crop material, grain is more efficiently released from the residue.

Preferably, the grooves of adjacent threshing slats have mirrored orientations so that rotation of the threshing drum alternately urges the crop material in a left and right direction. Due to the alternate orientation of the grooves, crop material is urged in alternate directions. When the grooves would have a similar orientation, the crop material would be urged towards one transverse end of the agricultural vehicle, thereby resulting in an instable threshing system.

Preferably, the grooves have a width that is at least one of substantially smaller and substantially larger than an average grain diameter. In other words, the grooves have a width that substantially deviates from an average grain diameter. Due to the deviation, a grain cannot get stuck in a groove.

BRIEF DESCRIPTION OF THE DRAWINGS

The invention will now be described in more details with respect to the drawings illustrating some preferred embodiments of the invention. In the drawings.

DETAILED DESCRIPTION OF PREFERRED EMBODIMENTS

Figure 1:
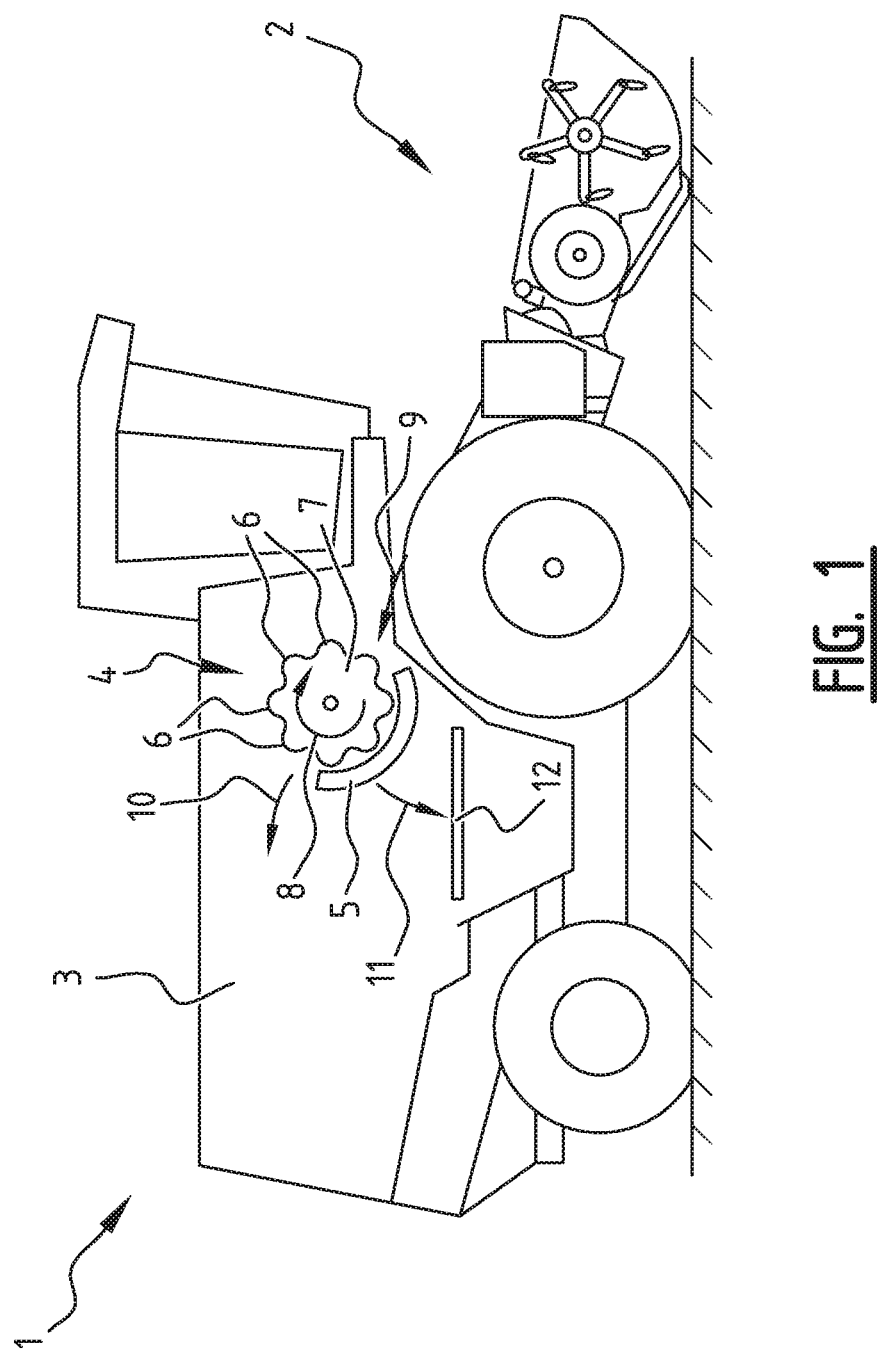
FIG. 1 illustrates an agricultural combine wherein a threshing drum and matching concave are shown.

In the drawings a same reference number has been allocated to a same or analogous element.

FIG. 1 shows an agricultural combine 1, wherein part of the combine processing elements that are normally covered by the combine body work, are shown in the figure. The agricultural combine 1 comprises a header 2 provided to cut crop material from a field, and to draw the crop material into the agricultural vehicle for further processing. The body 3 of the agricultural vehicle 1 comprises multiple elements for processing the crop material. One of the multiple elements is the threshing drum 4 and matching concave 5. The present invention particularly relates to improving these elements of the agricultural vehicle 1.

The threshing drum 4 comprises multiple threshing slats 6 that are mounted at a peripheral end of multiple spaced apart discs 7 that are mounted on a threshing drum axis. The threshing drum axis and the threshing slats 6 are preferably substantially parallel. The threshing drum axis is preferably oriented substantially horizontal and perpendicular to a forward driving direction of the agricultural vehicle 1. The threshing drum 4 and matching concave 5 are formed in such a manner that when the threshing drum is rotated, indicated in FIG. 1 with arrow 8, crop material 9 that enters the threshing drum is beaten and squeezed in the threshing drum and between the threshing drum 4 and the matching concave 5 in such a manner that grain or other seeds from the crop material 9 fall through the concave 5 indicated in FIG. 1 with arrow 11, while residue is pushed over the concave 5, illustrated in the figure with arrow 10. In this manner, crop material 9 entering the threshing drum 4 is threshed to separate grain or seeds 11 from residue 10. Thereby, it will be clear that the grain or seeds 11 that fall through the concave might still comprise small residue particles, which are separated from the grain or seeds in further processing steps. The grain or seeds 11 are therefore transported via transport element 12 to further processing steps. The residue 10 is typically expelled at a back end of the combine. The grain or seeds 11, after being completely processed are stored in the agricultural combine and are periodically unloaded from the combine 1. Since threshing drums and matching concaves are well known in the art of agricultural combines, the mechanical and operational details of the threshing drum and matching concave are not described in further detail.

Figure 2A:
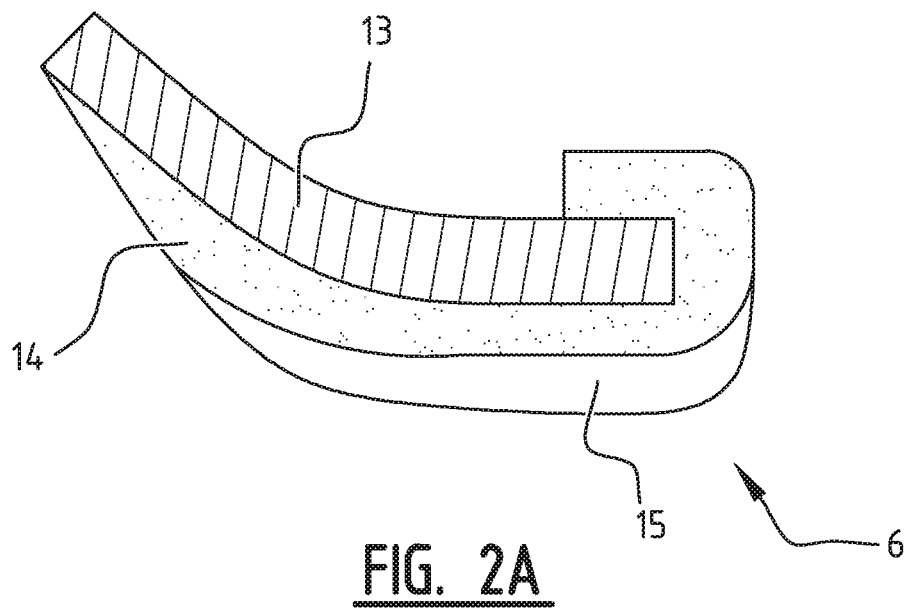
FIG. 2 shows a cross-sectional view of multiple embodiments of threshing slats of the invention.
Figure 2B:
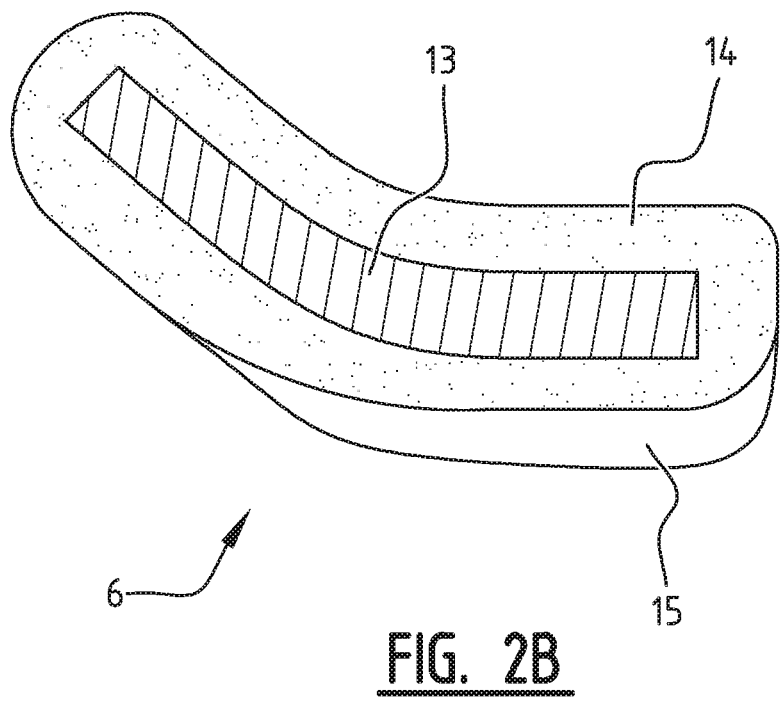

FIG. 2 shows a cross section of threshing slats 6 according to multiple embodiments of the present invention. Thereby, FIG. 2a illustrates a first embodiment wherein cross-sectional contour of the threshing slat 6 is only partly covered with a material having a predetermined hardness. In the second embodiment shown in FIG. 2b, the complete contour of the threshing slat 6 is covered with the material.

FIG. 2 shows an embodiment of the threshing slat wherein the threshing slat has a metal core 13. This metal core preferably has a curved cross-sectional shape, which is advantageous in the threshing process and which gives the threshing slat a high strength and resistance against bending. The metal core 13 is provided with a layer of a material 14, wherein the material 14 has a predetermined hardness. The part of the outer surface of the metal core 13 that is covered with the material 14 is referred to as the outer surface segment of the threshing slat 6. This outer surface segment will, when the drum is rotated with respect to the concave with crop material in the drum, beat and squeeze the crop material thereby releasing grain or seeds from residue in the crop material. This outer surface segment is selected as that part of the outer surface which accounts for the majority of the impact on the grain or seeds. Particularly, the outer surface segment is that part of the segment which faces the matching concave 5 at the moment threshing slat 6 is adjacent to the concave.

FIG. 2b shows a preferred embodiment wherein the complete cross-sectional contour of the metal core 13 of the threshing slat 6 is covered with the material having the predetermine hardness. An advantage of completely covering the metal core 13 is described above.

The material is preferably a polyurethane material having a hardness DIN 53749 Shore durometer A, hereafter Shore A, 92. It will be clear that other materials than polyurethane having such hardness may also be used to cover the metal core 13 of the slats 6. Tests have shown that when the material has a Shore A hardness higher than 90, preferably higher than 91, and has a Shore A hardness lower than 95, preferably lower than 93, most preferably about 92, the threshing slat performs optimal. With such hardness the threshing slat surface is hard enough to thresh the crop and at a micro scale the actual contact with the grain is still significantly less aggressive than with a steel threshing slat. This results in less grain damage. The resistance to absorb shocks and to resist the abrasive conditions seen in combines is a further advantage of the configuration shown in FIG. 2.

Figure 3:
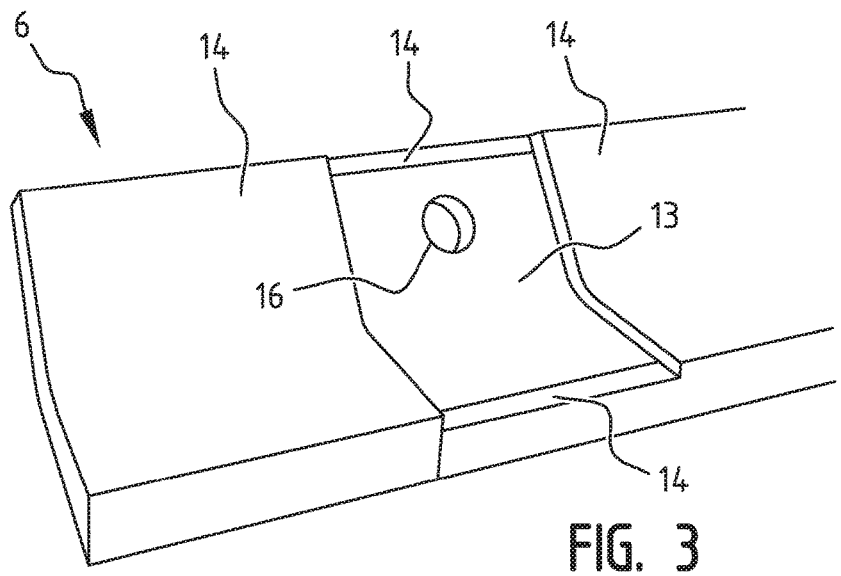
FIG. 3 shows a threshing slat at an inner side.

FIG. 3 shows a perspective view of a segment of the threshing slat. Thereby, FIG. 3 shows that the area where the threshing slat is connected to the disc of the multiple spaced apart discs is omitted from material. At a location where the threshing slat is mounted to the discs, the metal core 13 can be seen. Around this area, the metal core 13 is provided with the material 14. Omitting the material 14 at the location where the threshing slat is mounted to the discs allows to connect the threshing slat to the disc in a rigid and firm manner. For example, the threshing slat 6 can be screwed to the disc via a bolt or screw through opening 16.

Figure 4:
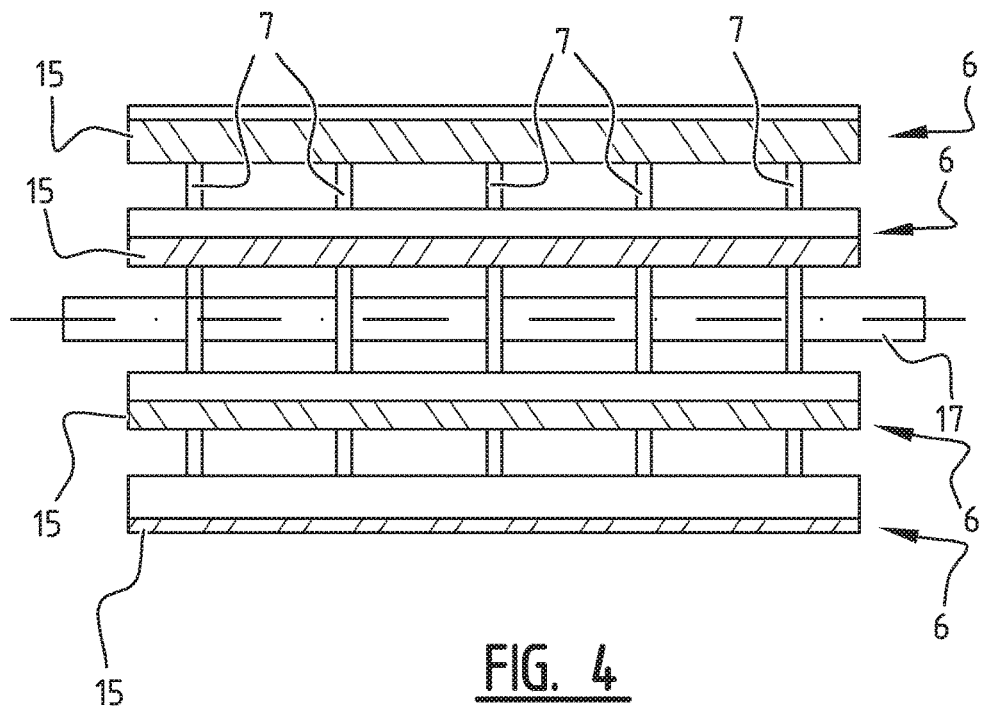
FIG. 4 shows a front view of a threshing drum with multiple threshing slats according to an embodiment of the invention.

FIG. 4 shows a front view of a threshing drum. Thereby, FIG. 4 shows the multiple spaced apart discs 7, and shows how multiple threshing slats 6 are mounted to the spaced apart discs 7 at a peripheral end thereof. The discs 7 are mounted on a threshing drum axis 17. The FIG. 4 shows how the threshing slats are preferably provided with grooves at the outer surface segment of the slats. These grooves extend over the complete length of the slats. The grooves have an orientation with respect to the slat direction between 25 degrees and 75 degrees. Adjacent slats 6 show a mirrored groove orientation so that grain is successively urged to the left side and to the right side of the agricultural vehicle. In this manner, crop material can be threshed in a balanced manner. The grooves 15 are also shown in FIG. 2. The position of the grooves, the orientation of the grooves, the number of threshing slats and the cross-sectional shape of the threshing slats may be formed according to prior art techniques and are therefore not described in further detail. The groove width preferably deviates from an average grain diameter so that grain does not get stuck in the grooves when the threshing drum is processing crop material.

Via the threshing drum with the threshing slats that are coated with a material having the predetermined above described hardness, significantly less grain damage will occur.

The above described embodiments and the shown figures are illustrative and serve only for a better understanding of the invention. The invention is not limited to the described embodiments. Different alternatives, and preferred features described in the text can be freely combined by a skilled person and developed in more detail to form an operational whole without departing from the claimed invention. The scope of protection of the invention will therefore be defined solely by the claims.

The invention claimed is:

1. Agricultural combine comprising
a threshing drum and a matching concave, the threshing drum comprising multiple spaced apart threshing slats each having an outer surface segment which, when the drum is rotated with respect to the concave with crop material in the drum, beats and squeezes the crop material thereby releasing grain from residue in the crop material, wherein at least the outer surface segment is formed from a material having a Shore A hardness higher than 90 and lower than 95.

2. The agricultural combine of claim 1, wherein the material has a Shore A hardness higher than 91 and lower than 93.

3. The agricultural combine of claim 1, wherein the material is a thermosetting polymer.

4. The agricultural combine of claim 1, wherein the threshing slats comprise a metal core, wherein the material is formed at least partially around the metal core.

5. The agricultural combine of claim 4, wherein the material covers the complete threshing slat when the threshing slat is considered in cross-section.

6. The agricultural combine of claim 1, wherein the threshing drum comprises multiple spaced apart disks mounted on a threshing drum axis and wherein the threshing slats are mounted at a peripheral end of the disks substantially parallel to the axis.

7. The agricultural combine according to claim 6, wherein the material is omitted at the location of connection between the disks and the threshing slats.

8. The agricultural combine according to claim 6, wherein the threshing drum axis is arranged substantially transverse to a forward driving direction of the agricultural combine.

9. The agricultural combine according to claim 1, wherein the threshing slats have a curved cross-sectional shape.

10. The agricultural combine according to claim 9, wherein the threshing slats have a cross-sectional shape wherein two substantially straight legs are interconnected via an intermediate curve, with an angle between the legs larger than 25 degrees and smaller than 75 degrees.

11. The agricultural combine according to claim 1, wherein the outer surface segment comprises grooves along substantially a complete length of the threshing slat.

12. The agricultural combine according to claim 11, wherein the grooves are oriented with respect to the longitudinal direction of the threshing slat at an angle larger than 25 degrees and smaller than 75 degrees.

13. The agricultural combine according to claim 12, wherein the grooves of adjacent threshing slats have mirrored orientations so that rotation of the threshing drum alternately urges the crop material in a left and in a right direction.

14. The agricultural combine according to claim 11, wherein each of the grooves has a width that is at least one of substantially smaller and substantially larger than an average grain diameter.

15. The agricultural combine according to claim 3, wherein the material is polyurethane.

* * * * *